United States Patent
Lipo et al.

(10) Patent No.: US 9,379,657 B2
(45) Date of Patent: Jun. 28, 2016

(54) UNITY POWER FACTOR INDUCTION MACHINE

(71) Applicant: Wisconsin Alumni Research Foundation, Madison, WI (US)

(72) Inventors: Thomas A. Lipo, Middletown, WI (US); Prabhdeep S. Virk, Davenport, IA (US)

(73) Assignee: Wisconsin Alumni Research Foundation, Madison, WI (US)

(*) Notice: Subject to any disclaimer, the term of this patent is extended or adjusted under 35 U.S.C. 154(b) by 30 days.

(21) Appl. No.: 14/107,159

(22) Filed: Dec. 16, 2013

(65) Prior Publication Data
US 2015/0171784 A1 Jun. 18, 2015

(51) Int. Cl.
*H02P 25/00* (2006.01)
*H02P 23/00* (2016.01)

(52) U.S. Cl.
CPC .................... *H02P 23/0081* (2013.01)

(58) Field of Classification Search
CPC .................................................. H02P 21/141
USPC .......................................... 318/727, 722, 729
See application file for complete search history.

(56) References Cited

U.S. PATENT DOCUMENTS

| | | | |
|---|---|---|---|
| 4,896,063 A | 1/1990 | Roberts | |
| 5,959,430 A * | 9/1999 | Yuki | H02P 21/085 318/805 |
| 7,005,825 B2 * | 2/2006 | Eguchi | 318/727 |
| 8,115,441 B2 * | 2/2012 | Romenesko et al. | 318/727 |
| 8,519,662 B2 * | 8/2013 | Lu et al. | 318/727 |
| 2001/0006335 A1 * | 7/2001 | Kondou et al. | 318/727 |
| 2002/0021105 A1 * | 2/2002 | Na | H02P 21/005 318/727 |
| 2002/0057069 A1 * | 5/2002 | Kushida | 318/727 |
| 2003/0020431 A1 * | 1/2003 | Kiuchi | D06F 37/304 318/779 |
| 2003/0094929 A1 * | 5/2003 | Pendell | H02K 17/42 322/44 |
| 2008/0315824 A1 * | 12/2008 | Arakawa | H02P 23/08 318/800 |
| 2009/0033254 A1 * | 2/2009 | Nagashima | B60L 11/005 318/139 |
| 2009/0174188 A1 | 7/2009 | Huang et al. | |
| 2011/0012544 A1 * | 1/2011 | Schulz | B60L 15/025 318/400.02 |
| 2012/0032622 A1 * | 2/2012 | Lipo | 318/400.27 |

OTHER PUBLICATIONS

Dqo transformation, Downloaded from http://en.wikipedia.org/wiki/Dqo_transformation on Oct. 22, 2013, pp. 1-6.
J. Holtz, Sensorless Control of Induction Motor Drives, Proceedings of the IEEE, vol. 90, No. 8, Aug. 2002, pp. 1359-1394.

* cited by examiner

*Primary Examiner* — Eduardo Colon Santana
*Assistant Examiner* — Cortez Cook
(74) *Attorney, Agent, or Firm* — Bell & Manning, LLC (57) ABSTRACT

A multi-phase voltage from a utility grid is applied to a first side of a plurality of open windings of a stator. A phase of the multi-phase voltage is determined. Stator currents measured from a second side of the plurality of open windings are converted to a non-rotating direct-quadrature (d-q) reference frame. A q-axis of the non-rotating d-q reference frame contains a voltage vector defined from the multi-phase voltage, and a d-axis is normal to the voltage vector. A d-axis component of the converted stator currents is applied as an error signal to a proportional-integral controller to determine an output voltage signal. The output voltage signal is converted from the non-rotating d-q reference frame to a reference frame defined by the phase. The output voltage signal is applied to an inverter to define a second output voltage. The second output voltage is applied to the second side of the plurality of open windings.

20 Claims, 9 Drawing Sheets

UNITY POWER FACTOR INDUCTION MACHINE

BACKGROUND

The induction machine is by far the most heavily used industrial motor and ranges in size from a fraction of a horsepower to over a megawatt. Induction machines produce torque by the electromagnetic interaction between the magnetic flux in the stator windings and the induced current in the rotor windings. As a result, the induction machine has the inherent property of consuming current at a lagging power factor. The power factor is the ratio of the true power (watts) used in a system to the apparent power (volt-amps (VA)) drawn from the source. Contributing to the power factor is reactive power (VA reactive (VAR)), which is the power stored in and discharged by induction motors. The power factor of an induction motor is used to evaluate how much electrical energy is being wasted during operation. The power factor of a typical squirrel cage induction motor at full load ranges from 0.84 to 0.91 for machine ratings between 5 and 300 horsepower. A low power factor means energy is being wasted.

SUMMARY

In an example embodiment, a method of controlling an induction machine is provided. A multi-phase voltage from a utility grid is applied to a first side of a plurality of open windings of a stator. A phase of the multi-phase voltage is determined. Stator currents measured from a second side of the plurality of open windings are converted to a non-rotating direct-quadrature (d-q) reference frame. A q-axis of the non-rotating d-q reference frame contains a voltage vector defined from the multi-phase voltage, and a d-axis is normal to the voltage vector. A d-axis component of the converted stator currents is applied as an error signal to a proportional-integral controller to determine an output voltage signal. The output voltage signal is converted from the non-rotating d-q reference frame to a reference frame defined by the phase. The output voltage signal is applied to an inverter to define a second output voltage. The second output voltage is applied to the second side of the plurality of open windings.

In another example embodiment, a computer-readable medium is provided having stored thereon computer-readable instructions that when executed by a processor, cause the processor to control an induction machine.

In yet another example embodiment, an induction machine system is provided. The induction machine system includes, but is not limited to, an induction machine and a controller. The induction machine includes, but is not limited to, a rotor, a stator, and a plurality of open windings electrically coupled to the stator. The controller includes, but is not limited to, a processor and a computer-readable medium operably coupled to the processor. The computer-readable medium has instructions stored thereon that, when executed by the processor, cause the processor to control the induction machine.

In yet another example embodiment, an induction motor is provided. The induction motor includes, but is not limited to, an inverter, a stator, a rotor, a plurality of open windings mounted to the stator, a phase determiner, a first transformer, a power factor controller, and a second transformer. The inverter includes, but is not limited to, direct current connectors and alternating current connectors. The rotor is configured to rotate. An air gap is formed between the stator and the rotor. A multi-phase voltage from a utility grid is connected to a first side of the plurality of open windings, and the alternating current connectors are connected to a second side of the plurality of open windings. The phase determiner is electrically coupled to receive the multi-phase voltage from the utility grid and is configured to determine a phase of the multi-phase voltage. The first transformer is electrically coupled to receive phase information defining the determined phase and to receive stator currents measured from the second side of the plurality of open windings. The first transformer is configured to transform the received stator currents to a non-rotating direct-quadrature (d-q) reference frame. A q-axis of the non-rotating d-q reference frame contains a voltage vector defined from the received multi-phase voltage. A d-axis of the non-rotating d-q reference frame is normal to the voltage vector. The power factor controller is electrically coupled to receive a d-axis component of the transformed stator currents as an error signal. The power factor controller is configured to determine a d-axis component of a reactive voltage that zeros the determined d-axis component of the transformed stator currents. The second transformer is electrically coupled to receive the phase information defining the determined phase and to receive the determined d-axis component of the reactive voltage. The second transformer is configured to transform the d-axis component of the reactive voltage to a coordinate reference frame defined by the determined phase to determine a transformed voltage. The transformed voltage is applied to the direct current connectors of the inverter.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
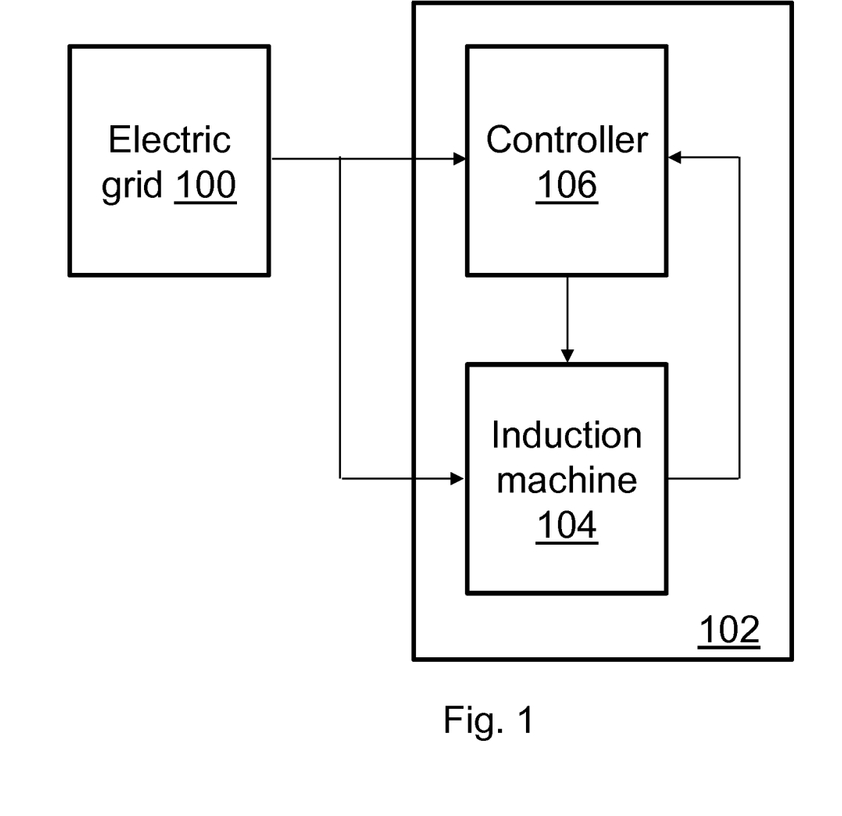
FIG. 1 depicts a portion of an induction machine system connected to an electric grid in accordance with an illustrative embodiment.

Referring to FIG. 1, an induction machine system 102 is connected to an electric grid 100. Electric grid 100 is shown electrically connected to a controller 106. Controller 106 is electrically connected to an induction machine 104. Induction machine 104 may be configured to act as a generator or a motor as understood by a person of skill in the art. Induction machine 104 may include a stator (not shown) and a rotor (not shown) with associated windings in various arrangements as understood by a person of skill in the art. An induction or asynchronous motor is an alternating current electric motor in which the electric current in the rotor winding needed to produce torque is induced by electromagnetic induction from the magnetic field formed by the current in the stator winding. The rotor of induction machine 104 may be either wound type or squirrel-cage type. Induction machine 104 further may be configured to have any size rating.

Induction machine 104 has an open winding configuration. In a typical induction machine, the windings are tied together at a point. In an open-winding configuration, the windings are not tied together. For example, a three-phase induction machine includes three open windings resulting in six terminals.

Controller 106 controls the supply of reactive power to/from induction machine 104 so that induction machine 104 can operate at approximately unity power factor with respect to the terminals connected to electric grid 100. As a result controller 106 ensures that induction machine 104 consumes voltage and current in phase from the terminals of electric grid 100. Controller 106 implements a closed loop power factor correction solution using an inverter. Induction machine 104 acts as the filter to smooth the current harmonics produced by a series connected inverter.

Figure 2:
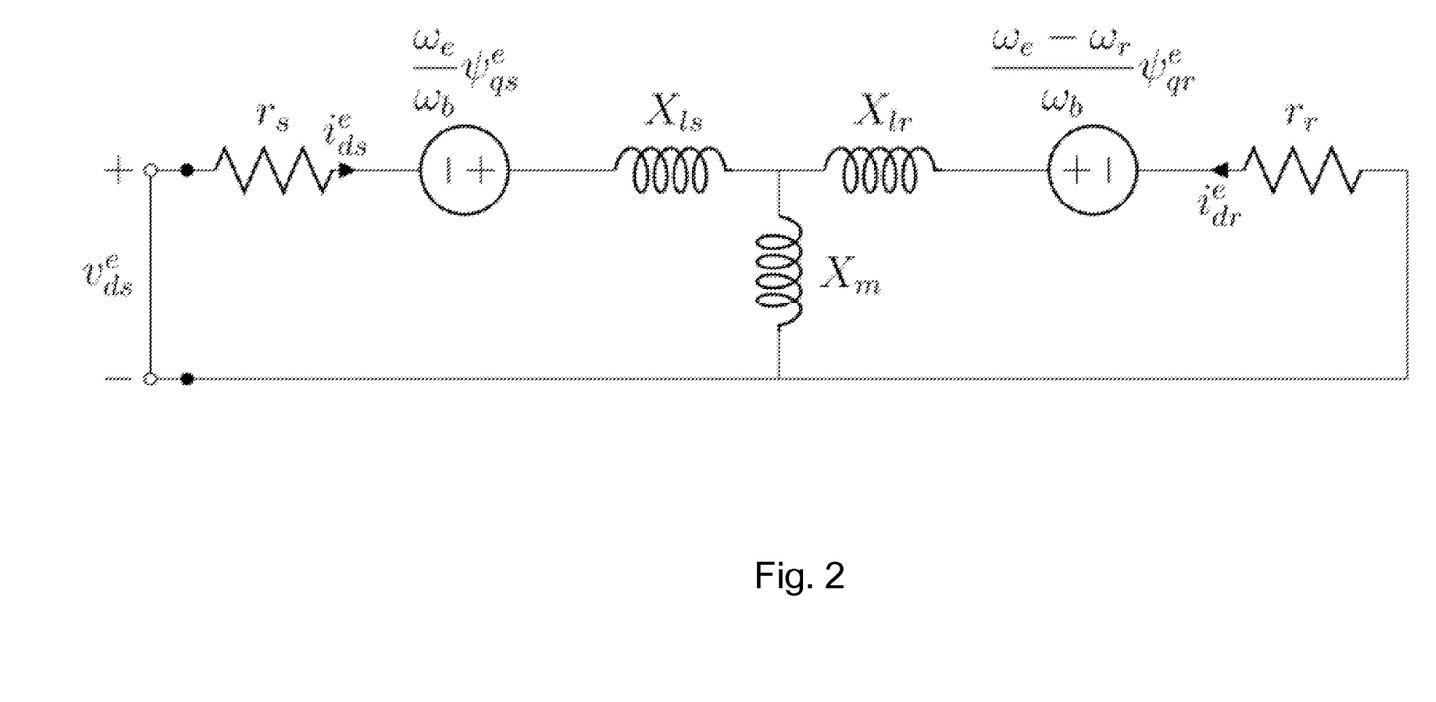
FIG. 2 depicts a first portion of an equivalent circuit of an induction machine of the induction machine system of FIG. 1 in a synchronously rotating direct (d) axis in accordance with an illustrative embodiment.
Figure 3:
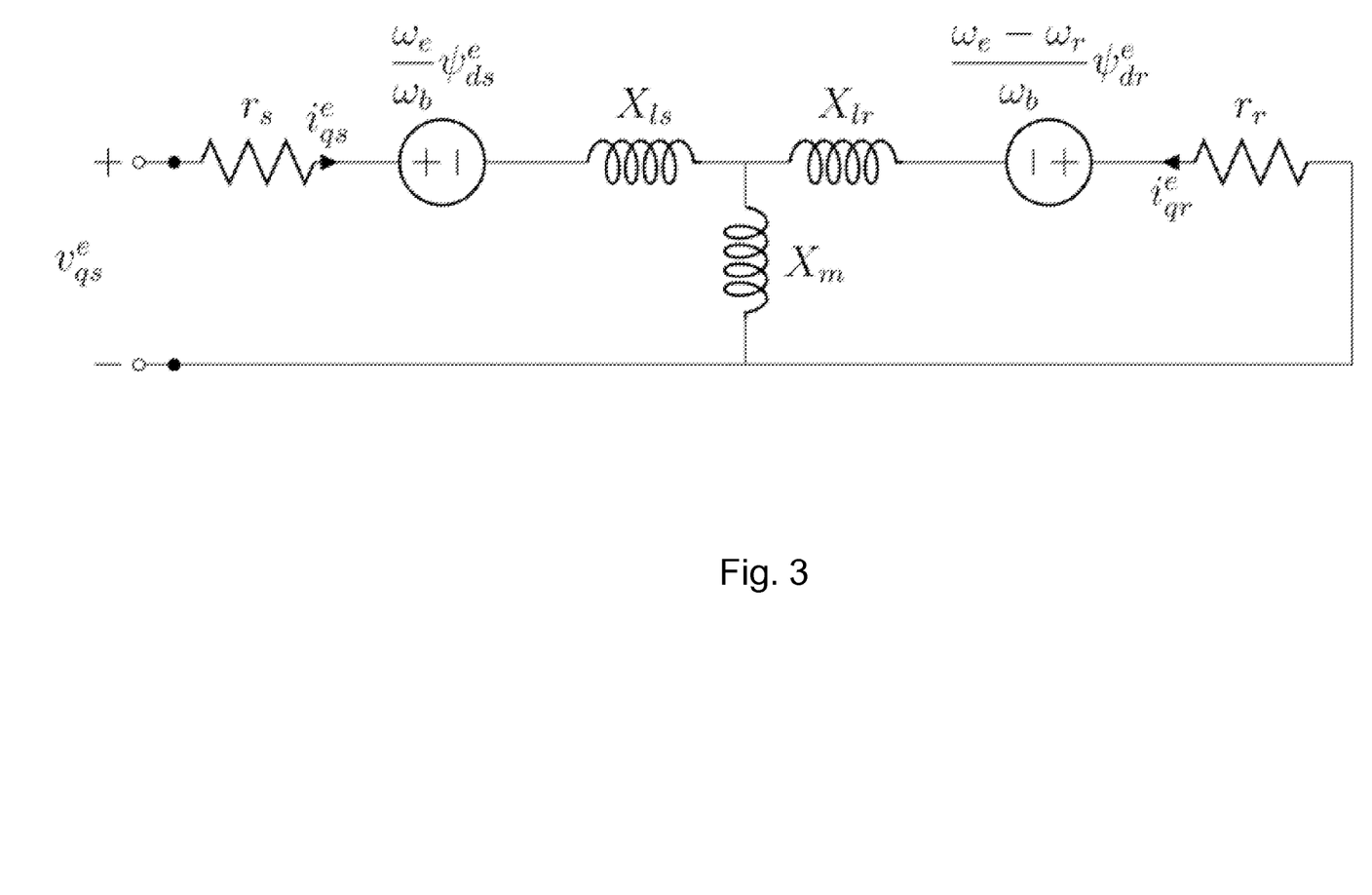
FIG. 3 depicts a second portion of the equivalent circuit of an induction machine of the induction machine system of FIG. 1 in a synchronously rotating quadrature (q) axis in accordance with an illustrative embodiment.

Referring to FIG. 2, an equivalent circuit of induction machine 104 is shown in the synchronously rotating direct (d) axis, where the subscript 'd' references the direct axis component in the direct-quadrature (d-q) coordinate reference frame, the subscript 's' references the stator, the subscript 'e' references a rotating reference frame, the subscript 'b' references a base quantity, the subscript 'r' references the rotor. 'X' references a reactance, 'r' references a resistance, 'v' references a voltage, 'i', references a current, '$\psi$' references flux linkage, and '$\omega$' references an angular velocity. Referring to FIG. 3, an equivalent circuit of induction machine 104 is shown in the synchronously rotating quadrature (q) axis where the subscript 'q' references the quadrature axis component in the d-q coordinate reference frame.

Figure 4A:
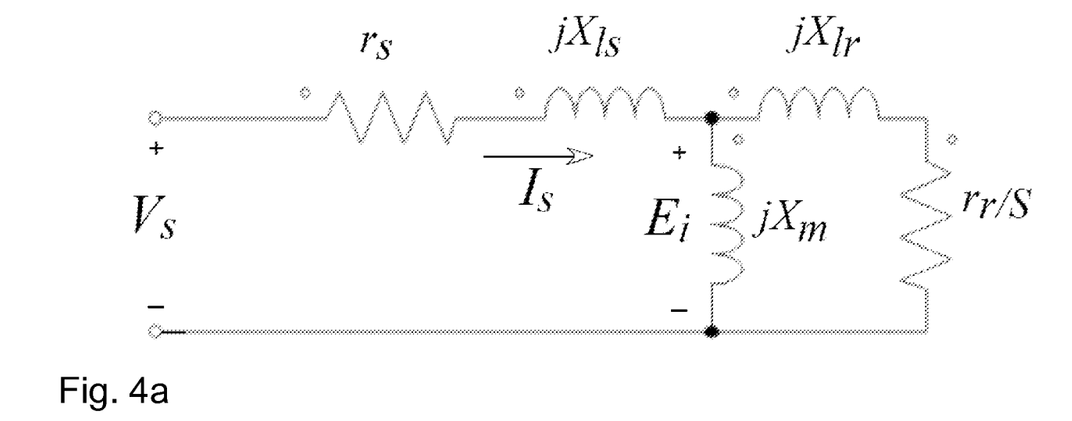
FIG. 4a depicts a Steinmetz equivalent circuit of the induction machine being fed from a single power source $V_s$ that represents the voltage from the electric grid in accordance with an illustrative embodiment.
Figure 4B:
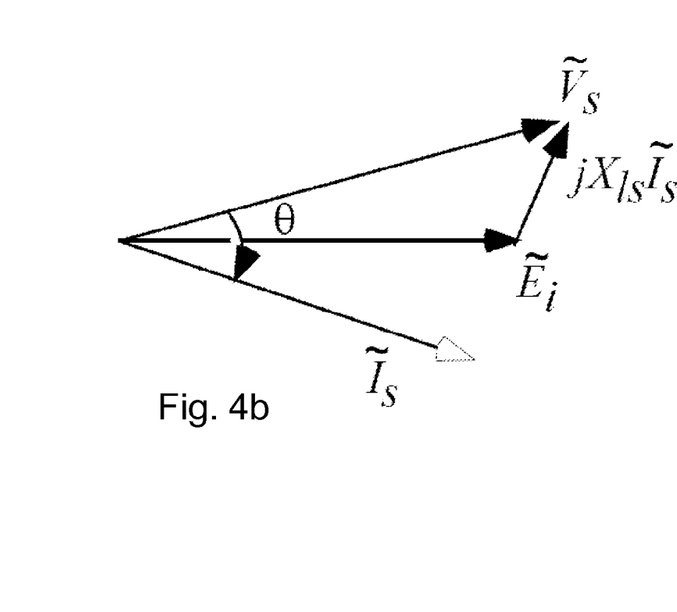
FIG. 4b depicts a steady-state phasor diagram of a stator circuit of the induction machine represented in FIG. 4a in accordance with an illustrative embodiment.
Figure 4C:
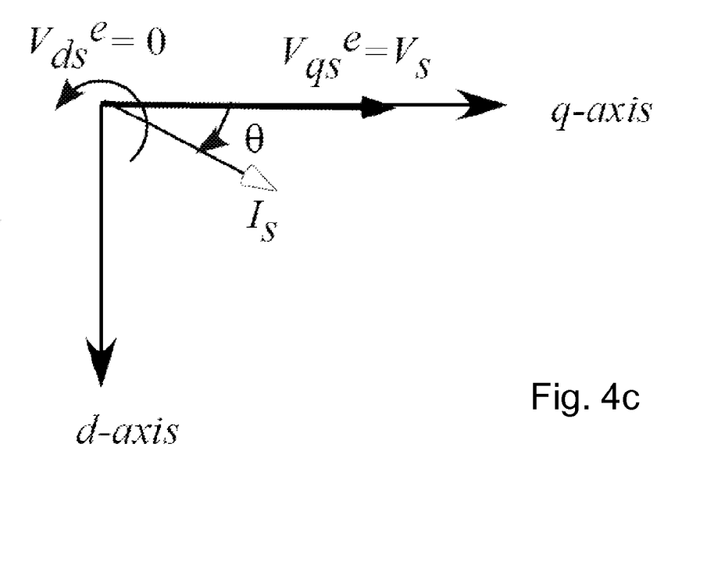
FIG. 4c depicts a vector diagram of the stator circuit of the induction machine represented in FIG. 4a in the synchronously rotating d-q reference frame in accordance with an illustrative embodiment.

Referring to FIG. 4a, a Steinmetz equivalent circuit of induction machine 104 is shown being fed from a single power source $V_s$ that represents the voltage from electric grid 100. Referring to FIG. 4b, a steady-state phasor diagram of the stator circuit of the system represented in FIG. 4a is shown. Referring to FIG. 4c, a vector diagram of the stator circuit of the system represented in FIG. 4a is shown in the synchronously rotating d-q reference frame. As in standard practice, the q-axis is assumed to be the axis containing the voltage vector $V_s$, and the current in this direction is the real power component. The d-axis contains the component of the current normal to the voltage vector $V_s$ and is the axis of the reactive power component. The current lags the terminal voltage in the phasor diagram by the phase angle $\theta$.

Figures 5A, 5B, 5C:
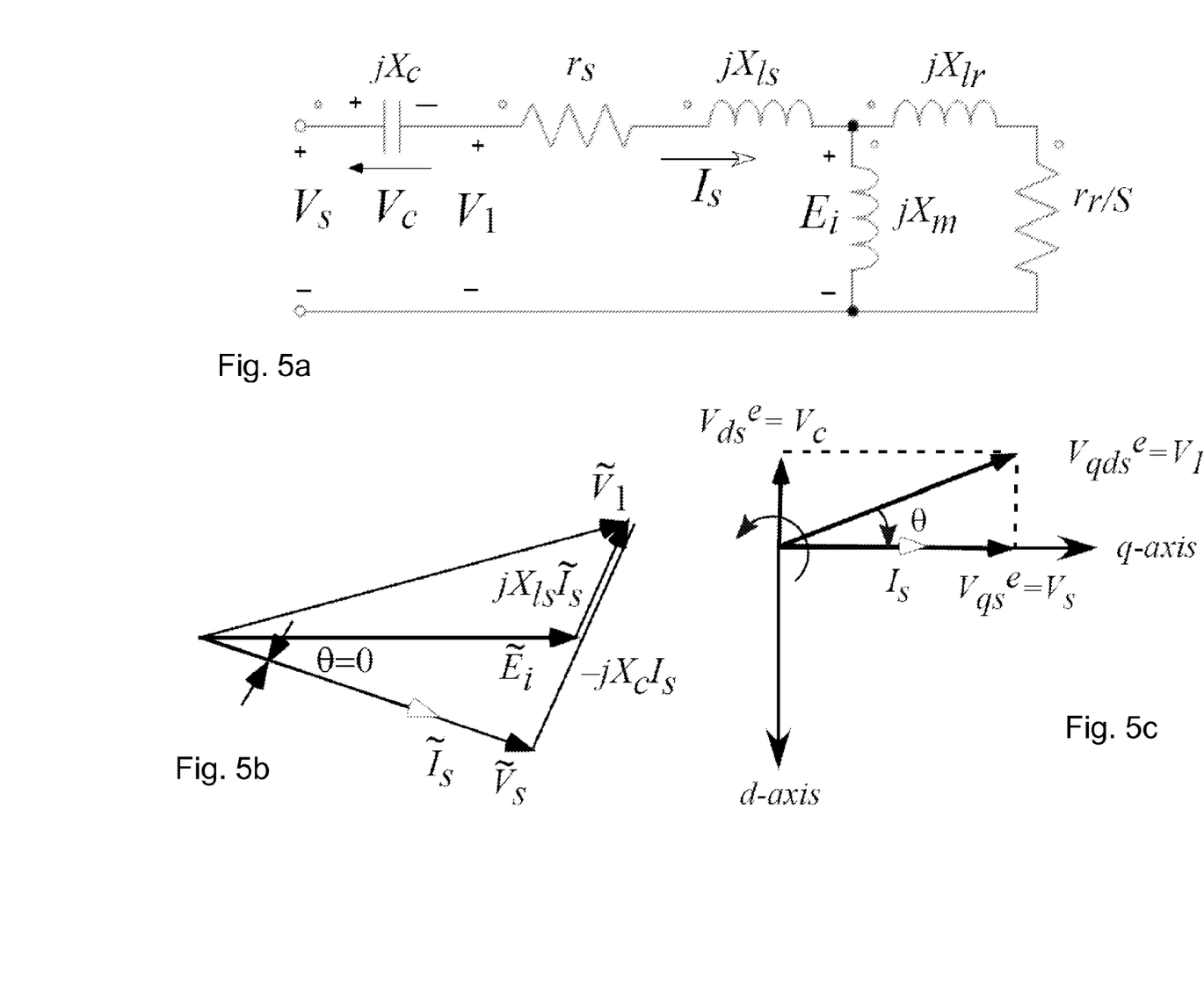
FIG. 5a depicts a Steinmetz equivalent circuit of the induction machine being fed from doubly fed by $V_s$ and an additional voltage $V_c$ that has been introduced in the negative d-axis in accordance with an illustrative embodiment.
FIG. 5b depicts a steady-state phasor diagram of a stator circuit of the induction machine represented in FIG. 5a in accordance with an illustrative embodiment.
FIG. 5c depicts a vector diagram of the stator circuit of the induction machine represented in FIG. 5a in the synchronously rotating d-q reference frame in accordance with an illustrative embodiment.

Referring to FIG. 5a, a Steinmetz equivalent circuit of induction machine 104 is shown being doubly fed by $V_s$ and an additional voltage $V_c$ introduced in the negative d-axis. Referring to FIG. 5b, a steady-state phasor diagram of the stator circuit of the system represented in FIG. 5a is shown. The additional voltage $V_c$, represented by a capacitor, is orthogonal to the applied voltage vector $V_s$. Referring to FIG. 5c, a vector diagram of the stator circuit of the system represented in FIG. 5a is shown in the synchronously rotating d-q reference frame. The synchronous frame representation circuit of FIG. 5c shows that the equivalent effect is obtained by applying a negative voltage in the d-axis equivalent to the capacitor voltage. When compensation is employed, the voltage across the motor windings increases as a result of applying the extra voltage $V_c$. That is, $V_1 > V_s$. Consequently, assuming constant speed and load torque, the current decreases, thereby reducing the stator copper losses. On the contrary, since the air gap voltage $E_i$ increases with the use of the capacitor, induction machine 104 will become somewhat more saturated. However, since copper losses are generally several times the iron losses for an induction machine, the overall efficiency is expected to rise slightly.

Figure 6:
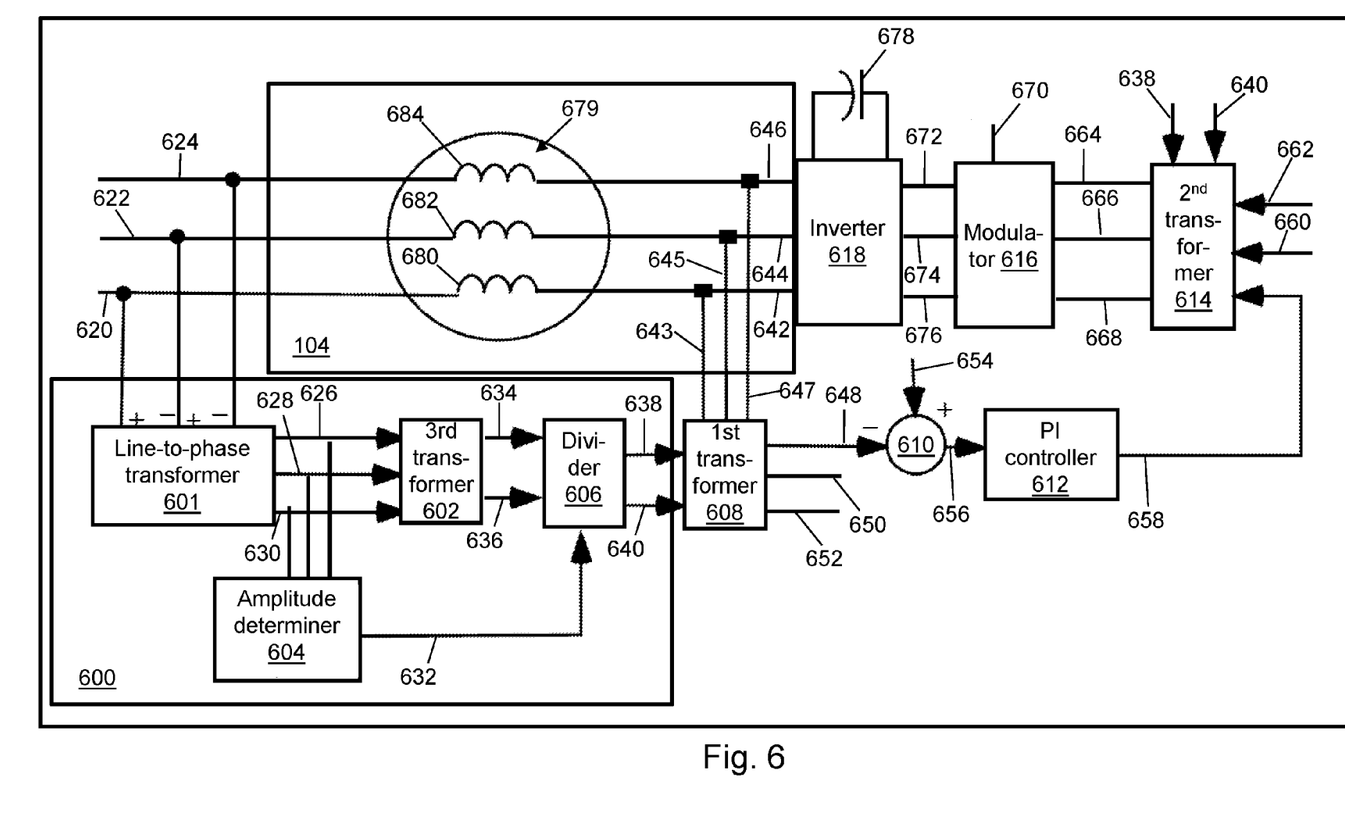
FIG. 6 depicts a block diagram of the induction machine system of FIG. 1 in accordance with an illustrative embodiment.

Referring to FIG. 6, a block diagram of induction machine system 102 is shown in accordance with an illustrative embodiment. In an illustrative embodiment, controller 106 may include a phase determiner 600, a first transformer 608, a subtractor 610, a proportional integral (P1) controller 612, a second transformer 614, a modulator 616, and an inverter 618. Phase determiner 600 may include a line-to-phase transformer 601, a third transformer 602, an amplitude determiner 604, and a divider 606.

In an illustrative embodiment, three phase voltages $v_a$ 620, $v_b$ 622, and $v_c$ 624 are received from a utility grid. $v_a$ 620, $v_b$ 622, and $v_c$ 624 are supplied to line-to-phase transformer 601. Line-to-phase transformer 601 transforms $v_a$ 620, $v_b$ 622, and $v_c$ 624 to phase voltages $v_{aa}$ 626, $v_{bb}$ 628, and $v_{cc}$ 630 using $$v_{aa} = \frac{2v_{ab}}{3} + \frac{1v_{bc}}{3}, v_{bb} = \frac{1v_{bc}}{3} - v_{ab}, \text{ and } v_{cc} = \frac{v_{ab}}{3} - \frac{2v_{bc}}{3},$$

where $v_{ab} = V_a - v_b$ and $v_{bc} = v_b - v_C$.

The phase voltages $v_{aa}$ 626, $v_{bb}$ 628, and $v_{cc}$ 630 are supplied to third transformer 602. Third transformer 602 transform phase voltages $v_{aa}$ 626, $v_{bb}$ 628, and $v_{cc}$ 630 to a non-rotating d-q reference frame using $$v_q = \frac{2v_{aa}}{3} - \frac{1v_{bb}}{3} - \frac{1v_{cc}}{3}, v_d = \frac{1}{\sqrt{3}}(v_{cc} - v_{bb}), \text{ and}$$

$$v_o = \frac{1}{3}(v_{aa} + v_{bb} + v_{cc}).$$

$v_q$ 634 and $V_d$ 636 are supplied to divider 606.

The phase voltages $v_{aa}$ 626, $V_{bb}$ 628, and $v_{cc}$ 630 are supplied to amplitude determiner 604. Amplitude determiner 604 calculates a magnitude $V_s$ 632 of the phase voltages $v_{aa}$ 626, $v_{bb}$ 628, and $v_{cc}$ 630 as $$V_s = \sqrt{\frac{2}{3}} \sqrt{v_{aa}^2 + v_{bb}^2 + v_{cc}^2}.$$

$V_s$ 632 is supplied to divider 606. Divider 606 determines a phase as either $$\theta = \cos^{-1}\left(\frac{v_q}{V_s}\right) \text{ or } \theta = \sin^{-1}\left(\frac{-v_d}{V_s}\right).$$

In an illustrative embodiment, cos θ 638 and sin θ 640 are supplied to first transformer 608. In another illustrative embodiment, θ is supplied to first transformer 608.

A plurality of open windings 679 of induction machine 104 are mounted to the stator of induction machine 104. In the illustrative embodiment, the plurality of open windings 679 include a first open winding 680, a second open winding 682, and a third open winding 684. In a typical induction machine, the windings are tied together at a point in the induction machine. In an open-winding induction machine, the windings are not tied together. First open winding 680, second open winding 682, and third open winding 684 are connected between utility grid 100 and inverter 618. First open winding 680 is supplied $V_a$ 620 on a first side and an inverter output voltage $V_{an}$ 642 on a second side. Second open winding 682 is supplied $V_b$ 622 on a first side and an inverter output voltage $V_{bn}$ 644 on a second side. Third open winding 684 is supplied $v_c$ 624 on a first side and an inverter output voltage $v_{cn}$ 646 on a second side.

Stator currents are measured from induction machine 104. For example, referring to FIG. 6, a first stator current $i_a$ 643, a second stator current $i_b$ 645, and a third stator current $i_c$ 647 are measured and input to first transformer 608. First transformer 608 transforms first stator current $i_a$ 643, second stator current $i_b$ 645, and third stator current $i_c$ 646 from the abc stator reference frame to the stationary (non-rotating) d-q reference frame by applying a conversion matrix defined as $$\begin{bmatrix} i_d \\ i_q \\ i_o \end{bmatrix} = \sqrt{\frac{2}{3}} \begin{bmatrix} \cos\theta & \cos\left(\theta - \frac{2\pi}{3}\right) & \cos\left(\theta + \frac{2\pi}{3}\right) \\ -\sin\theta & -\sin\left(\theta - \frac{2\pi}{3}\right) & -\sin\left(\theta + \frac{2\pi}{3}\right) \\ \frac{\sqrt{2}}{2} & \frac{\sqrt{2}}{2} & \frac{\sqrt{2}}{2} \end{bmatrix} \begin{bmatrix} i_a \\ i_b \\ i_c \end{bmatrix}$$

D-axis component of the stator current, $i_d$ 648, q-axis component of the stator current, $i_q$ 650, and o-axis component of the stator current, $i_o$ 652, may be output from first transformer 608. $i_d$ 648 is input to subtractor 610. A desired d-axis component of the stator current, $i^*_d$ 654 is input to subtractor 610 to define an error signal 656 as $i_{err} = i^*_d - i_d$. To operate at unity power factor, $i^*_d$ 654 is selected as zero.

Figure 7:
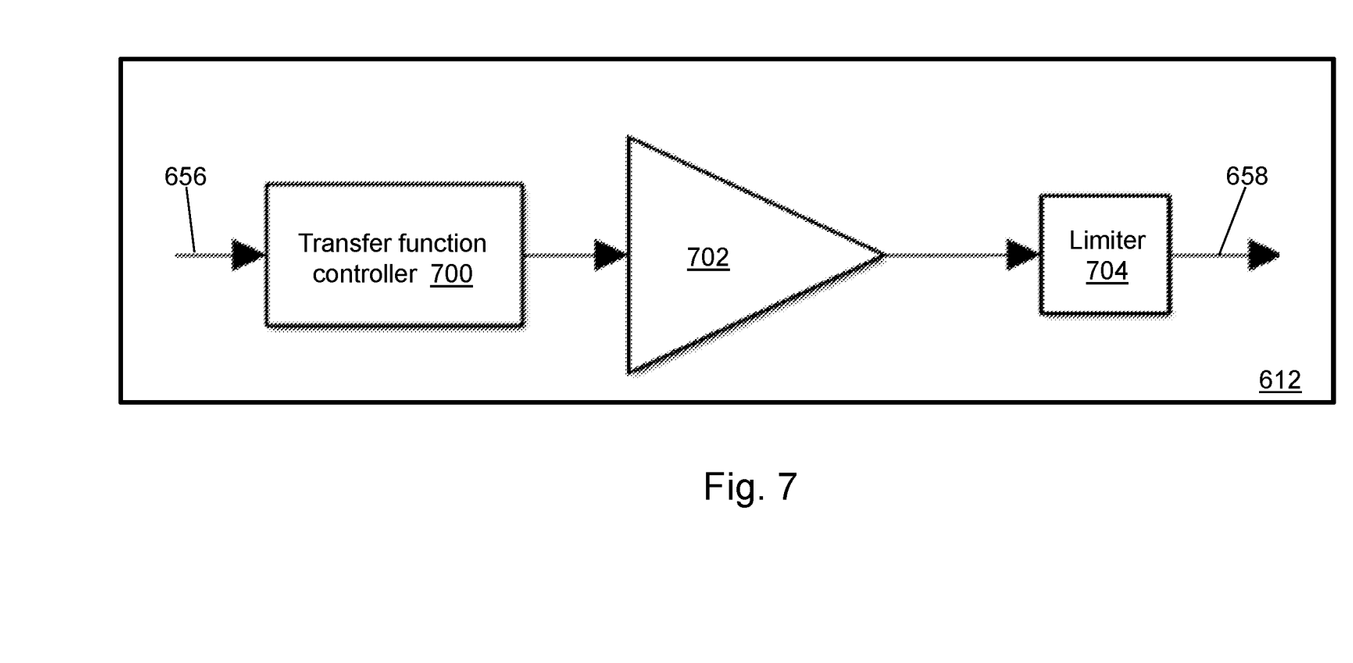
FIG. 7 depicts a block diagram of a proportional-integral (P-I) controller of the induction machine system of FIG. 1 in accordance with an illustrative embodiment.

Error signal 656 is input to PI controller 612. A d-axis component of a reactive voltage, $v_{dd}$ 658, is output from PI controller 612 and input to second transformer 614. Referring to FIG. 7, a block diagram of PI controller 612 is shown in accordance with an illustrative embodiment. PI controller 612 may include a transfer function controller 700, an amplifier 702, and a limiter 704. Transfer function controller 700 defines a time constant and amplifier 702 provides a controller gain of PI controller 612. The parameters of PI controller 612 are defined based on the parameters of induction machine 104 as understood by a person of skill in the art.

To design the gain and time constant, the poles and zeros of the transfer function $i_{err}/v_d$ can be defined for induction machine 104. For example, for a typical 50 horsepower motor operating at its rated load condition, the transfer function can be calculated as $$G_p(s) = \frac{i_{err}(s)}{v_d(s)} = \frac{631.3(s+209.9)(s+10.1)(s^2-14.7s+4662)}{(s+9.5)(s^2+287s+22e03)(s^2+98.9s+1.25e05)}$$

assuming a stator winding resistance, $r_s$, =0.087Ω, a rotor winding resistance, $r_r$=0.228Ω, a rotor winding leakage reactance, $X_{lr}$=0.302Ω, a stator winding leakage reactance, $X_{ls}$=0.302Ω, a magnetizing branch reactance: $X_m$=13.08Ω, and an inertia, J=2.1 kg m² based on the equivalent circuit of FIG. 4a.

The table below shows the location of the poles and zeros for the open loop transfer function defined by $G_p(s)$ at rated load

| Pole Value | Damping Ratio ζ | Frequency (rad/s) |
| --- | --- | --- |
| −49.4 ± j356 | 0.137 | 360 |
| −144 ± j39.3 | 0.964 | 158 |
| −9.6 | 1 | — |

In an illustrative embodiment, a controller transfer function can be defined as $$G_c(s) = 36.1 \frac{\left(1 + \frac{s}{60}\right)}{s}$$

resulting in the location of the poles and zeros shown in the table below based on the closed loop transfer function at rated load

| Pole Value | Damping Ratio ζ | Frequency (rad/s) |
| --- | --- | --- |
| −255 ± j232 | 0.739 | 345 |
| −124 ± j97 | 0.788 | 158 |
| −13.2 | 1 | — |
| −5.77 | 1 | — |

Given these parameters, transfer function controller 700 is defined as $$\frac{(0.0167s + 1)}{s}$$

and amplifier 702 is configured to provide a gain of −36.1.

A q-axis component of the reactive voltage, $v_{dq}$ 660, and an o-axis component of the reactive voltage, $v_{do}$ 662, are input to second transformer 614. To operate at unity power factor, $v_{dq}$ 660 and $v_{do}$ 662 are selected as zero. In an illustrative embodiment, cos θ 638 and sin θ 640 are supplied to second transformer 614. In another illustrative embodiment, θ is supplied to second transformer 614. Second transformer 614 transforms the d-axis component of the reactive voltage, $v_{dd}$ 658, the q-axis component of the reactive voltage, $v_{dq}$ 660, and the o-axis component of the reactive voltage, $v_{do}$ 662 from the non-rotating) d-q reference frame to the abc stator reference frame by applying a conversion matrix defined as $$\begin{bmatrix} v_a \\ v_b \\ v_c \end{bmatrix} = \sqrt{\frac{2}{3}} \begin{bmatrix} \cos\theta & -\sin\theta & \frac{\sqrt{2}}{2} \\ \cos\left(\theta - \frac{2\pi}{3}\right) & -\sin\left(\theta - \frac{2\pi}{3}\right) & \frac{\sqrt{2}}{2} \\ \cos\left(\theta + \frac{2\pi}{3}\right) & -\sin\left(\theta + \frac{2\pi}{3}\right) & \frac{\sqrt{2}}{2} \end{bmatrix} \begin{bmatrix} v_{dd} \\ v_{dq} \\ v_{do} \end{bmatrix}$$

An a-axis component of the reactive voltage, $v_a$ 664, a b-axis component of the reactive voltage, $v_b$ 666, and a c-axis component of the reactive voltage, $v_c$ 668, may be output from second transformer 614 and input to modulator 616. In an illustrative embodiment, a triangle wave 670 is applied as an input to modulator 616. A modulated a-axis component of the reactive voltage, $v_{am}$ 676, a modulated b-axis component of the reactive voltage, $v_{bm}$ 674, and a modulated c-axis component of the reactive voltage, $v_{cm}$ 672, are modulated by triangle wave 670 and output from modulator 616. Other modulation signals may be used in alternative embodiments, including a sawtooth wave.

The modulated a-axis component of the reactive voltage, $v_{am}$ 676, the modulated b-axis component of the reactive voltage, $v_{bm}$ 674, and the modulated c-axis component of the reactive voltage, $v_{cm}$ 672 are applied as inputs to inverter 618. Because the VAR of an induction motor nominally requires only 10-30% of its rated VA requirements, inverter 618 may have a reduced rating. Inverter 618 can be incorporated inside a housing of induction machine 104 so that induction machine 104 appears to be, in effect, a synchronous motor with field control having a unity power factor for all load conditions. In an illustrative embodiment, inverter 618 is a sinusoidal, bipolar switching, pulse-width modulation (PWM) voltage source inverter that converts voltage $v_{am}$ 676, $v_{bm}$ 674, and $v_{cm}$ 672 to $v_{an}$ 642, $v_{bn}$ 644, and $v_{cn}$ 646. PWM control compares an output waveform to a reference signal and adjusts a duty cycle of a switching mechanism.

Figure 8:
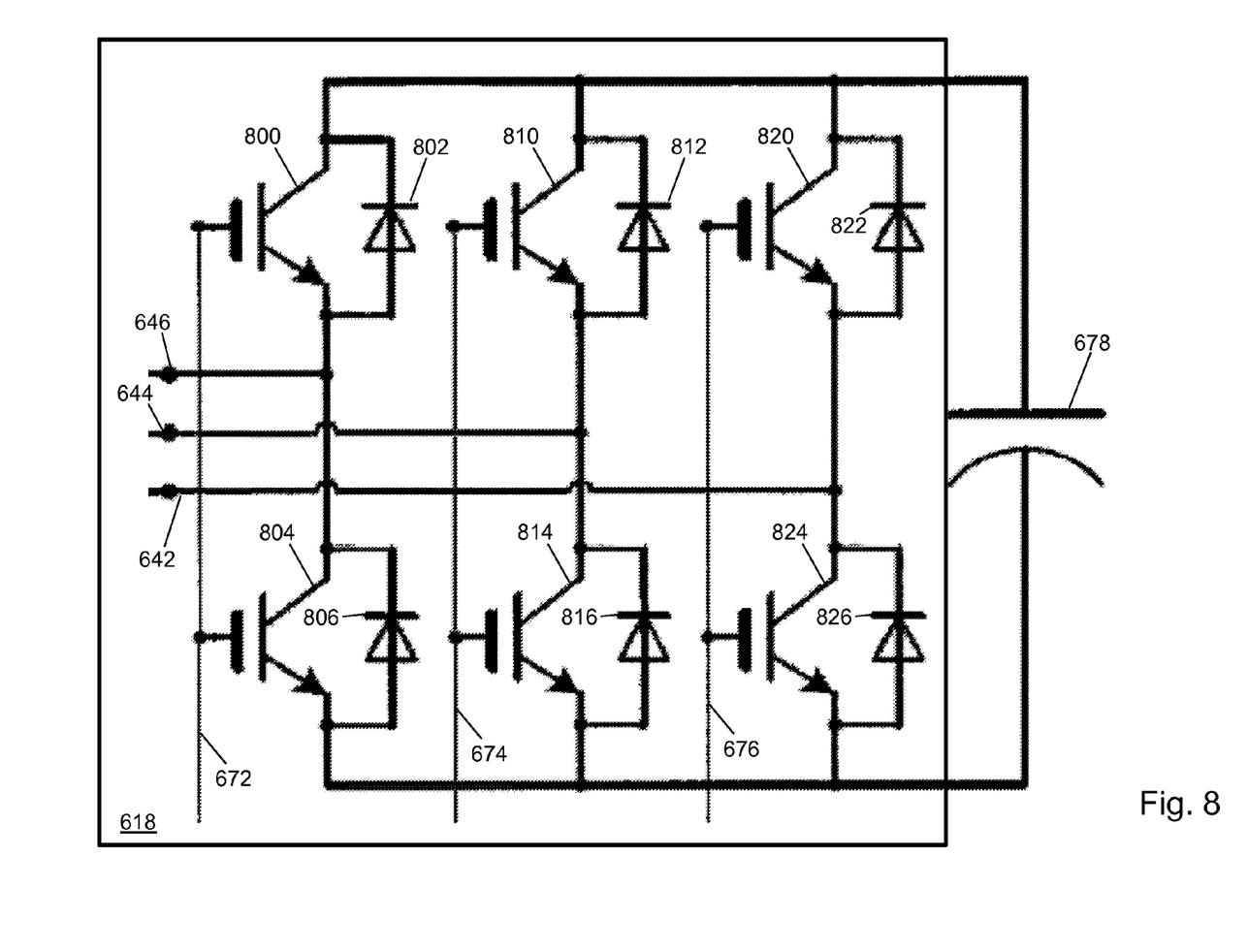
FIG. 8 depicts a circuit diagram of an inverter of the induction machine system of FIG. 1 in accordance with an illustrative embodiment.

Referring to FIG. 8, a circuit diagram of inverter 618 is shown in accordance with an illustrative embodiment. Inverter 618 may include a first transistor switch 800, a first diode 802, a second transistor switch 804, and a second diode 806 connected to receive $v_{cm}$ 672 at a base of first transistor switch 800 and of second transistor switch 804. First diode 802 is connected anti-parallel across the collector and emitter of first transistor switch 800. Second diode 806 is connected anti-parallel across the collector and emitter of second transistor switch 804. $v_{cn}$ 646 is output from a line connected between first transistor switch 800 and second transistor switch 804.

Inverter 618 further may include a third transistor switch 810, a third diode 812, a fourth transistor switch 814, and a fourth diode 816 connected to receive $v_{bm}$ 674 at a base of third transistor switch 810 and of fourth transistor switch 814. Third diode 812 is connected anti-parallel across the collector and emitter of third transistor switch 810. Fourth diode 816 is connected anti-parallel across the collector and emitter of fourth transistor switch 814. $v_{bn}$ 644 is output from a line connected between third transistor switch 810 and fourth transistor switch 814.

Inverter 618 further may include a fifth transistor switch 820, a fifth diode 822, a sixth transistor switch 824, and a sixth diode 826 connected to receive $v_{am}$ 676 at a base of fifth transistor switch 820 and of sixth transistor switch 824. Fifth diode 822 is connected anti-parallel across the collector and emitter of fifth transistor switch 820. Sixth diode 826 is connected anti-parallel across the collector and emitter of sixth transistor switch 824. $v_{an}$ 642 is output from a line connected between fifth transistor switch 820 and sixth transistor switch 824.

Inverter 618 may be described as including a plurality of direct current connectors and a plurality of alternating current connectors. The plurality of direct current connectors comprise the connectors to which $v_{am}$ 676, $v_{bm}$ 674, and $v_{cm}$ 672 are applied. The plurality of alternating current connectors comprise the connectors to which $v_{an}$ 642, $v_{bn}$ 644, and $v_{cn}$ 646 are applied.

Capacitor 678 is connected across a direct current side of inverter 618. Capacitor 678 provides the reactance $X_c$ and resulting additional voltage $V_c$ introduced in the negative d-axis as described with reference to FIGS. 5a, 5b, and 5c. Capacitor 678 is a floating capacitor that achieves the zeroing of the power factor of induction machine 104 as viewed from utility grid 110.

Figure 9:
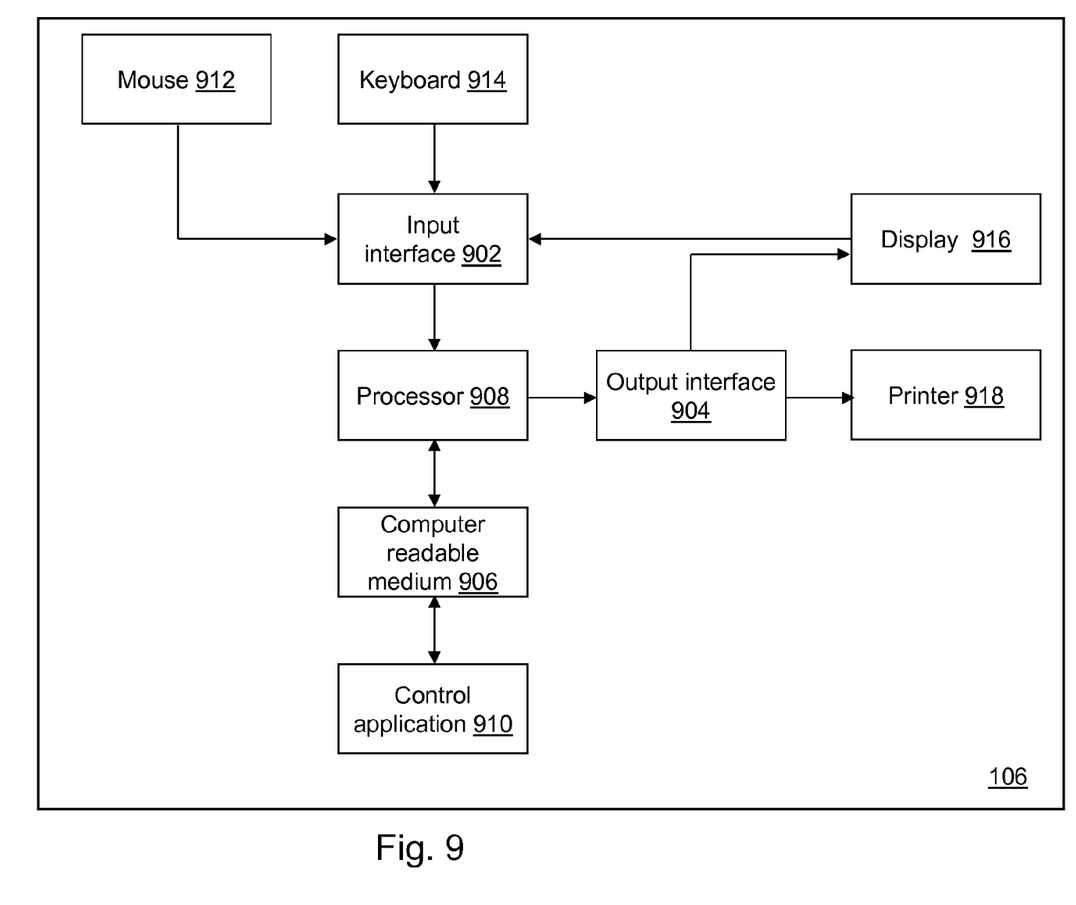
FIG. 9 depicts a block diagram of a controller of the induction machine system of FIG. 1 in accordance with an illustrative embodiment.

Referring to FIG. 9, a block diagram of controller 106 is shown in accordance with an illustrative embodiment. Controller 106 may include an input interface 902, an output interface 904, a computer-readable medium 906, a processor 908, a control application 910, a keyboard 914, a mouse 912, a display 916, and a printer 918. Fewer, different, and additional components may be incorporated into controller 106. Controller 106 further may include electrical circuit components connected to processor 908 and/or computer-readable medium 906.

Input interface 902 provides an interface for receiving information from the user or from other devices for entry into controller 106 as understood by those skilled in the art. Input interface 902 may interface with various input technologies including, but not limited to, keyboard 914, mouse 912, display 916, a track ball, a keypad, one or more buttons, etc. to allow the user to enter information into controller 106 or to make selections in a user interface displayed on display 916. The same interface may support both input interface 902 and output interface 904. For example, a display comprising a touch screen both allows user input and presents output to the user. Controller 106 may have one or more input interfaces that use the same or a different input interface technology. Additional inputs to controller 106, as discussed above, include $v_a$ 620, $v_b$ 622, $v_c$ 624, first stator current $i_a$ 643, second stator current $i_b$ 645, and third stator current $i_c$ 647.

Output interface 904 provides an interface for outputting information for review by a user of controller 106 and for input to another device. For example, output interface 904 may interface with various output technologies including, but not limited to, display 916 and printer 918, etc. Controller 106 may have one or more output interfaces that use the same or a different interface technology. Additional outputs from controller 106, as discussed above, include $v_{an}$ 642, $v_{bn}$ 644, and $v_{cn}$ 646, which are supplied to the second side of the open windings 679.

Computer-readable medium 906 is an electronic holding place or storage for information so the information can be accessed by processor 908 as understood by those skilled in the art. Computer-readable medium 906 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, cache memory, etc. Controller 106 may have one or more computer-readable media that use the same or a different memory media technology. Controller 106 also may have one or more drives that support the loading of a memory media such as a CD or DVD.

Processor 908 executes instructions as understood by those skilled in the art. The instructions may be carried out by a special purpose computer, logic circuits, or hardware circuits. Processor 908 may be implemented in hardware and/or firmware, or any combination of these methods. The term "execution" is the process of running an application or the carrying out of the operation called for by an instruction. The instructions may be written using one or more programming language, scripting language, assembly language, etc. Processor 908 executes an instruction, meaning it performs/controls the operations called for by that instruction. Processor 908 operably couples with input interface 902, with output interface 904, and with computer-readable medium 906 to receive, to send, and to process information. Processor 908 may retrieve a set of instructions from a permanent memory device and copy the instructions in an executable form to a temporary memory device that is generally some form of RAM. Controller 106 may include a plurality of processors that use the same or a different processing technology.

Control application 910 performs operations associated with implementing some or all of the closed loop control system as described with reference to FIGS. 6, 7, and 8. The operations may be implemented using hardware, firmware, software, or any combination of these methods. Referring to the example embodiment of FIG. 9, control application 910 is implemented in software (comprised of computer-readable and/or computer-executable instructions) stored in computer-readable medium 906 and accessible by processor 908 for execution of the instructions that embody the operations of control application 910. Control application 910 may be written using one or more programming languages, assembly languages, scripting languages, etc.

As used in this disclosure, the term "connect" includes join, unite, mount, couple, associate, insert, hang, hold, affix, attach, fasten, bind, paste, secure, bolt, screw, rivet, pin, nail, clasp, clamp, cement, fuse, solder, weld, glue, form over, slide together, layer, and other like terms. The phrases "connected on" and "connect d to" include any interior or exterior portion of the element referenced. These phrases also encompass direct connection (in which the referenced elements are in direct contact) and indirect connection (in which the referenced elements are not in direct contact, but are mounted together via intermediate elements). Elements referenced as connected to each other herein may further be integrally formed together. As a result, elements described herein as being connected to each other need not be discrete structural elements. The elements may be connected permanently, removably, or releasably.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. A non-transitory computer-readable medium having stored thereon computer-readable instructions that when executed by a processor cause the processor to:
   (a) receive a multi-phase voltage from a utility grid applied to a first side of a plurality of open windings of a stator of an induction machine;
   (b) determine a phase of the received multi-phase voltage;
   (c) receive stator currents measured from a second side of the plurality of open windings of the stator;
   (d) convert the received stator currents to a non-rotating direct-quadrature (d-q) reference frame, wherein a q-axis of the non-rotating d-q reference frame contains a voltage vector defined from the received multi-phase voltage, and a d-axis of the non-rotating d-q reference frame is normal to the voltage vector;
   (e) apply a d-axis component of the converted stator currents as an error signal to a proportional-integral controller to determine an output voltage signal;
   (f) convert the output voltage signal from the non-rotating d-q reference frame to a reference frame defined by the determined phase; and
   (g) apply the converted output voltage signal to an inverter to define a second output voltage, wherein the second output voltage is applied to the second side of the plurality of open windings.

2. The computer-readable medium of claim 1, wherein a q-axis component of the output voltage signal is zero.

3. The computer-readable medium of claim 1, wherein the multi-phase voltage comprises three phases.

4. The computer-readable medium of claim 1, wherein the computer-readable instructions further cause the processor to repeat (a)-(g) at a next time step.

5. The computer-readable medium of claim 1, wherein, after (f) and before (g), the computer-readable instructions further cause the processor to modulate the converted output voltage signal using a triangle wave before the converted output voltage signal is applied to the inverter.

6. The computer-readable medium of claim 1, wherein determining the phase comprises computer-readable instructions that further cause the processor to transform the multi-phase voltage from the utility grid to phase voltages and to transform the phase voltages to the non-rotating d-q reference frame, wherein the phase is determined as $$\cos^{-1}\left(\frac{v_q}{V_s}\right),$$

where $v_q$ is a q-axis component of the transformed phase voltages, and $V_s$ is a magnitude of the multi-phase voltage.

7. The computer-readable medium of claim 1, wherein determining the phase comprises computer-readable instructions that further cause the processor to transform the multi-phase voltage from the utility grid to phase voltages and to transform the phase voltages to the non-rotating d-q reference frame, wherein the phase is determined as $$\sin^{-1}\left(\frac{-v_d}{V_s}\right),$$

where $v_d$ is a d-axis component of the transformed phase voltages, and $V_s$ is a magnitude of the multi-phase voltage.

8. An induction machine system comprising:
an induction machine comprising a rotor, a stator, and a plurality of open windings electrically coupled to the stator; and
a controller comprising a processor and a computer-readable medium having stored thereon computer-readable instructions that when executed by the processor cause the processor to
 (a) receive a multi-phase voltage from a utility grid applied to a first side of the plurality of open windings;
 (b) determine a phase of the received multi-phase voltage;
 (c) receive stator currents measured from a second side of the plurality of open windings;
 (d) convert the received stator currents to a non-rotating direct-quadrature (d-q) reference frame, wherein a q-axis of the non-rotating d-q reference frame contains a voltage vector defined from the received multi-phase voltage, and a d-axis of the non-rotating d-q reference frame is normal to the voltage vector;
 (e) apply a d-axis component of the converted stator currents as an error signal to a proportional-integral controller to determine an output voltage signal;
 (f) convert the output voltage signal from the non-rotating d-q reference frame to a reference frame defined by the determined phase; and
 (g) apply the converted output voltage signal to an inverter to define a second output voltage, wherein the second output voltage is applied to the second side of the plurality of open windings.

9. The induction machine system of claim 8, wherein a q-axis component of the output voltage signal is zero.

10. The induction machine system of claim 8, wherein the inverter is a pulse width modulation inverter.

11. The induction machine system of claim 8, wherein the computer-readable instructions further cause the processor to repeat (a)-(g) at a next time step.

12. The induction machine system of claim 8, wherein, after (f) and before (g), the computer-readable instructions further cause the processor to modulate the converted output voltage signal using a triangle wave before the converted output voltage signal is applied to the inverter.

13. The induction machine system of claim 8, wherein determining the phase comprises computer-readable instructions that further cause the processor to transform the multi-phase voltage from the utility grid to phase voltages and to transform the phase voltages to the non-rotating d-q reference frame, wherein the phase is determined as $$\cos^{-1}\left(\frac{v_q}{V_s}\right),$$

where $v_q$ is a q-axis component of the transformed phase voltages, and $V_s$ is a magnitude of the multi-phase voltage.

14. The induction machine system of claim 8, wherein the phase determiner is configured to transform the multi-phase voltage from the utility grid to phase voltages and to transform the phase voltages to the non-rotating d-q reference frame, wherein the phase is determined as $$\sin^{-1}\left(\frac{-v_d}{V_s}\right),$$

where $v_d$ is a d-axis component of the transformed phase voltages, and $V_s$ is a magnitude of the multi-phase voltage.

15. An induction motor comprising:
an inverter comprising direct current connectors and alternating current connectors;
a stator;
a rotor configured to rotate, wherein an air gap is formed between the stator and the rotor;
a plurality of open windings mounted to the stator, wherein a multi-phase voltage from a utility grid is connected to a first side of the plurality of open windings, and further wherein the alternating current connectors are connected to a second side of the plurality of open windings;
a phase determiner electrically coupled to receive the multi-phase voltage from the utility grid, the phase determiner configured to determine a phase of the multi-phase voltage;
a first transformer electrically coupled to receive phase information defining the determined phase and to receive stator currents measured from the second side of the plurality of open windings, the first transformer configured to transform the received stator currents to a non-rotating direct-quadrature (d-q) reference frame, wherein a q-axis of the non-rotating d-q reference frame contains a voltage vector defined from the received multi-phase voltage, and a d-axis of the non-rotating d-q reference frame is normal to the voltage vector;
a power factor controller electrically coupled to receive a d-axis component of the transformed stator currents as an error signal, the power factor controller configured to determine a d-axis component of a reactive voltage that zeros the received d-axis component of the transformed stator currents; and
a second transformer electrically coupled to receive the phase information defining the determined phase and to receive the determined d-axis component of the reactive voltage, the second transformer configured to transform the received d-axis component of the reactive voltage to a coordinate reference frame defined by the determined phase to determine a transformed voltage, wherein the transformed voltage is applied to the direct current connectors of the inverter.

16. The induction motor of claim 15, wherein a q-axis component of the reactive voltage is zero.

17. The induction motor of claim 15, wherein a floating capacitor is connected across a direct current side of the inverter.

18. The induction motor of claim 15, further comprising a modulator configured to modulate the transformed voltage using a triangle wave before the transformed voltage is applied to the direct current connectors of the inverter.

19. The induction motor of claim 15, wherein the phase determiner is configured to transform the multi-phase voltage from the utility grid to phase voltages and to transform the phase voltages to the non-rotating d-q reference frame, wherein the phase is determined as $$\cos^{-1}\left(\frac{v_q}{V_s}\right),$$

where $v_q$ is a q-axis component of the transformed phase voltages, and $V_s$ is a magnitude of the multi-phase voltage.

20. The induction motor of claim 15, wherein the phase determiner is configured to transform the multi-phase voltage from the utility grid to phase voltages and to transform the phase voltages to the non-rotating d-q reference frame, wherein the phase is determined as $$\sin^{-1}\left(\frac{-v_d}{V_s}\right),$$

where $v_d$ is a q-axis component of the transformed phase voltages, and $V_s$ is a magnitude of the multi-phase voltage.

* * * * *